Jan. 28, 1947.　　　W. M. RUST, JR　　　2,414,899
WELL LOGGING
Filed Sept. 14, 1940　　　4 Sheets—Sheet 1

William M. Rust Jr. INVENTOR.
BY P. J. Whelan
ATTORNEY.

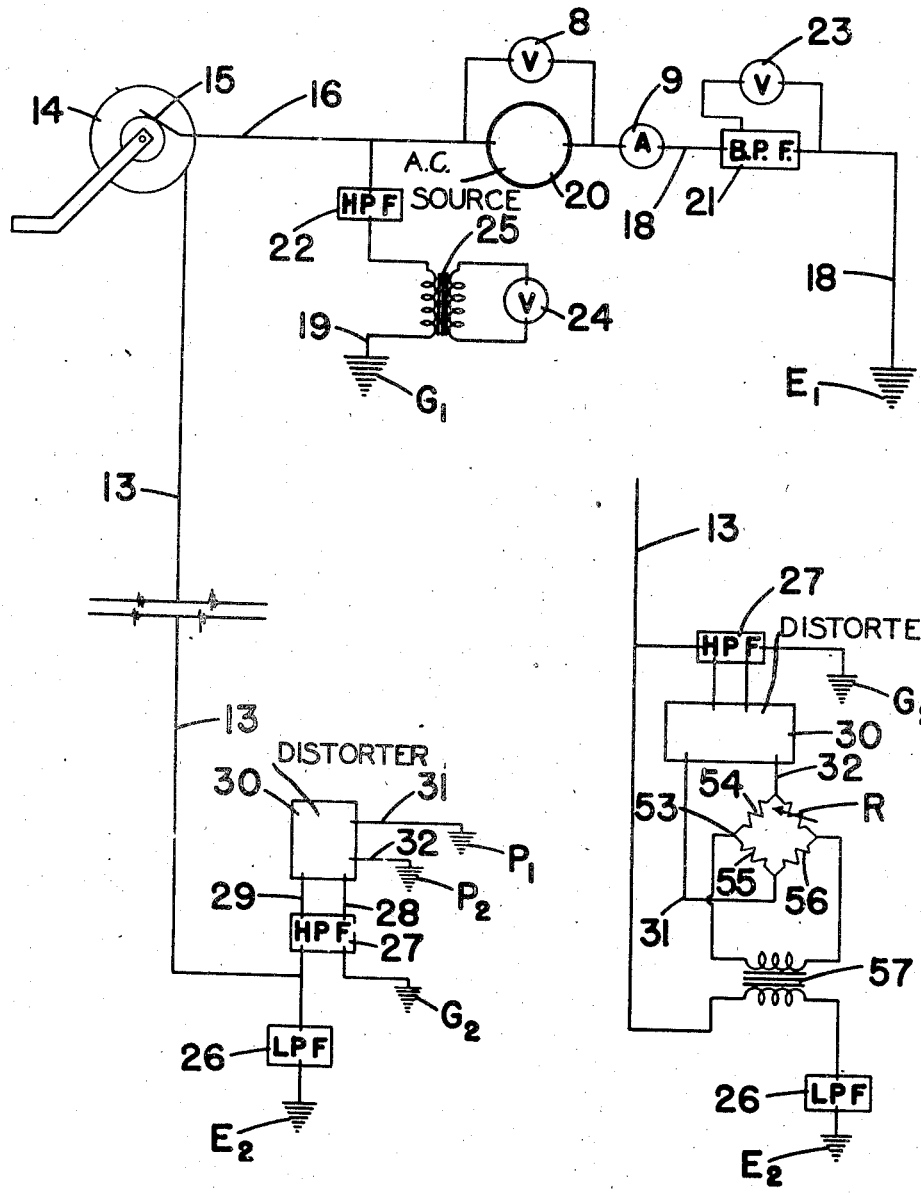

Jan. 28, 1947.  W. M. RUST, JR  2,414,899
WELL LOGGING
Filed Sept. 14, 1940  4 Sheets—Sheet 4

William M. Rust Jr. INVENTOR.
BY P. J. Whelan
ATTORNEY.

Patented Jan. 28, 1947

2,414,899

UNITED STATES PATENT OFFICE 2,414,899

WELL LOGGING

William M. Rust, Jr., Houston, Tex., assignor to Standard Oil Development Company, a corporation of Delaware Application September 14, 1940, Serial No. 356,803

2 Claims. (Cl. 175—182)

The present invention relates to improvement in electrical well logging.

It is an object of the present invention to make simultaneous measurements of three electrical qualities in a bore hole.

It is a further object of the present invention to provide apparatus, a portion of which is arranged at the surface of the earth, and another portion of which is lowered into a bore hole, these two portions being connected together by a single conductor cable and being capable of obtaining three electrical measurements.

It is a further object of the present invention to lower into a bore hole apparatus provided with a distorting device which allows a signal to be transmitted to the surface of the earth at a higher frequency than the frequency of the power transmitted from the surface of the earth to the electrode.

Another object of the present invention is to measure natural potential, single electrode impedance and four electrode mutual impedance simultaneously with an apparatus requiring only a single conductor cable.

Another object of the present invention is to measure the natural potential, single electrode impedance and temperature simultaneously with the use of a single conductor cable.

Other objects and advantages of the present invention may be seen from a reading of the following description taken in conjunction with the accompanying drawings in which Fig. 1 is a view, partly in cross section, of one modification of the present invention being used to obtain measurements in a bore hole;

Fig. 2 is a wiring diagram showing broadly the construction of the device shown in Fig. 1;

Fig. 2A is a wiring diagram showing broadly the construction of the movable element appearing in Fig. 1A;

Before describing the drawings specifically, it may be pointed out that in general the invention resides in passing an energizing current of a given frequency through a conducting cable, modifying or distorting this frequency in accordance with a function of a value which it is desired to measure, then passing the signal through a filter which will remove the energizing current, and allow the signal to be received at the surface of the earth.

Figures 1, 1A:
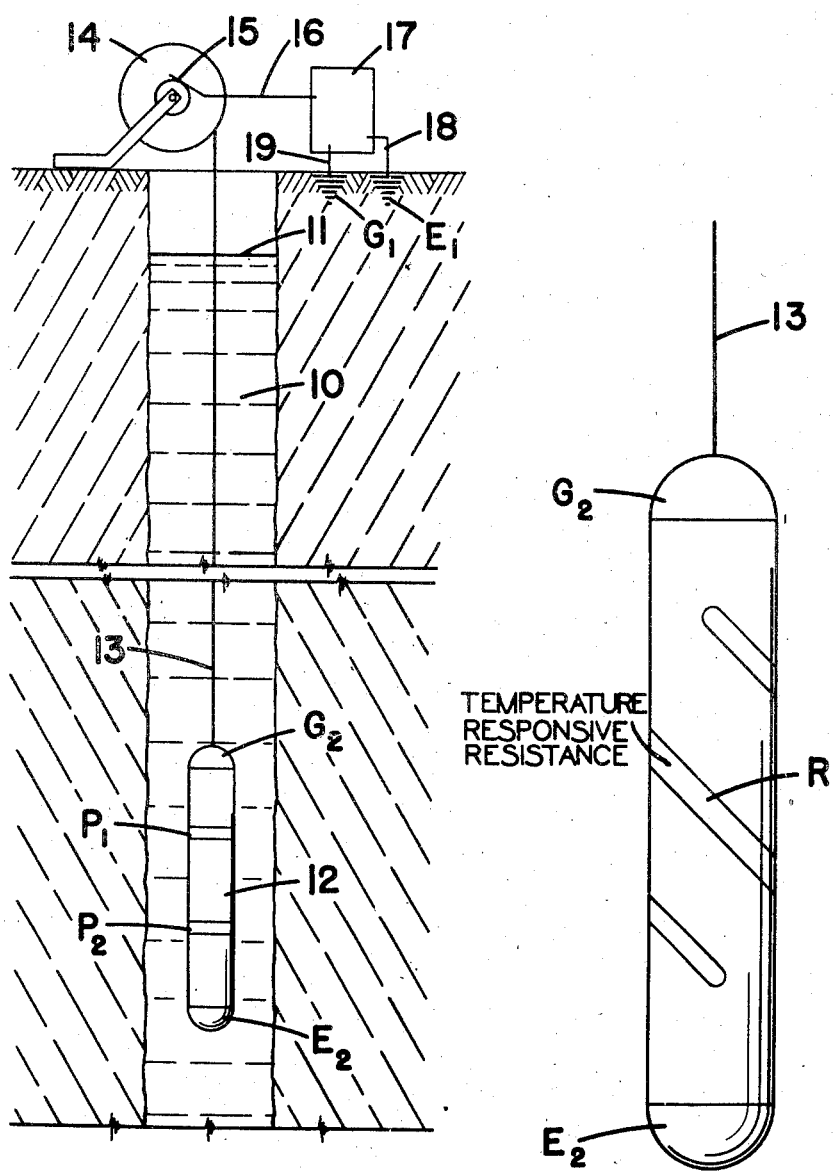
Fig. 1A is a view of the cable-suspended portion of an apparatus directed to another modification of the present invention.
Figure 3:
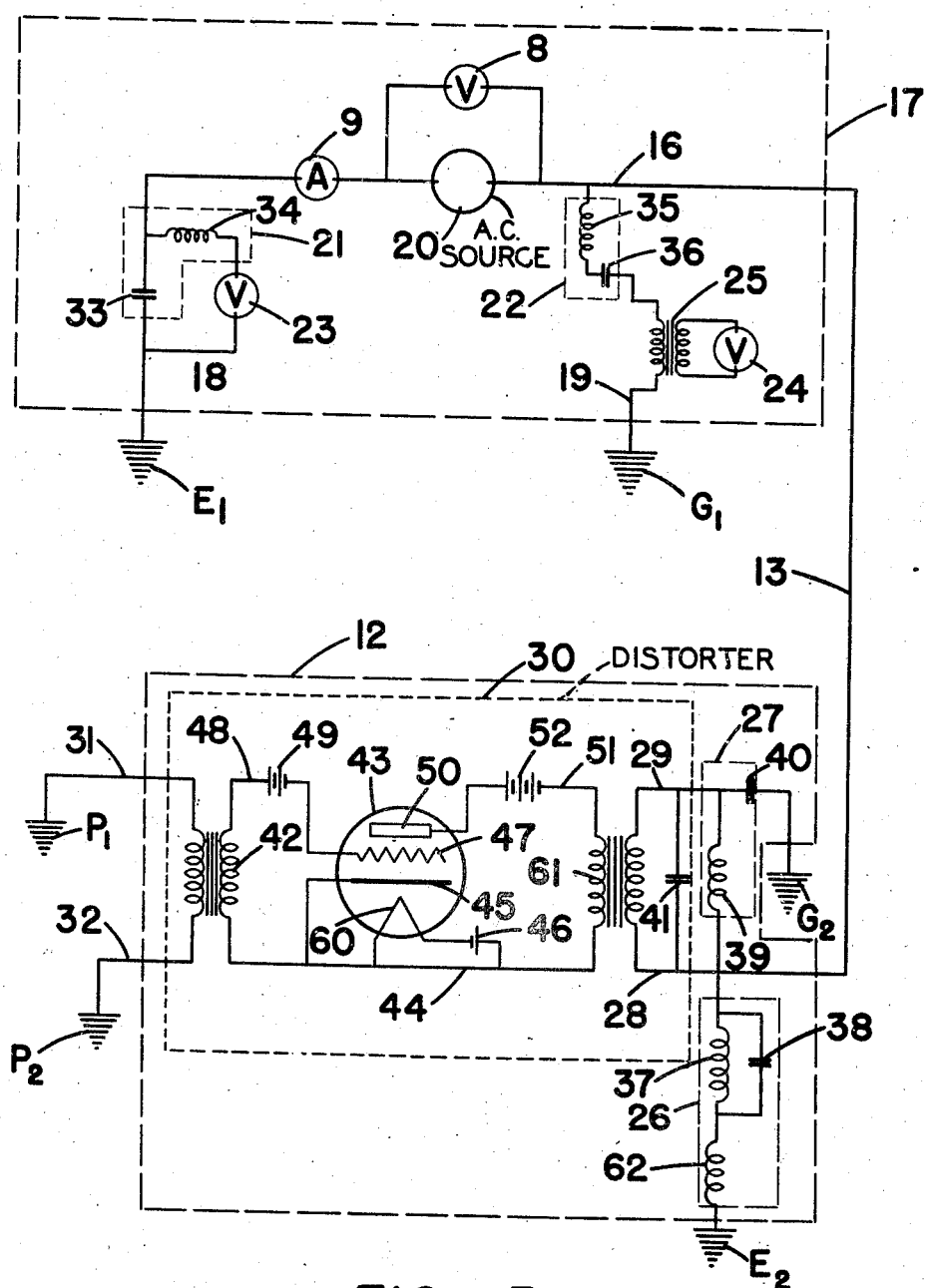
Fig. 3 is a wiring diagram showing in detail the construction of the modification depicted in Figs. 1 and 2.

In the modifications shown in Figs. 1, 2 and 3, an apparatus is shown which will obtain these three measurements, the natural potential, single electrode impedance, and four electrode mutual impedance.

Figure 3A:
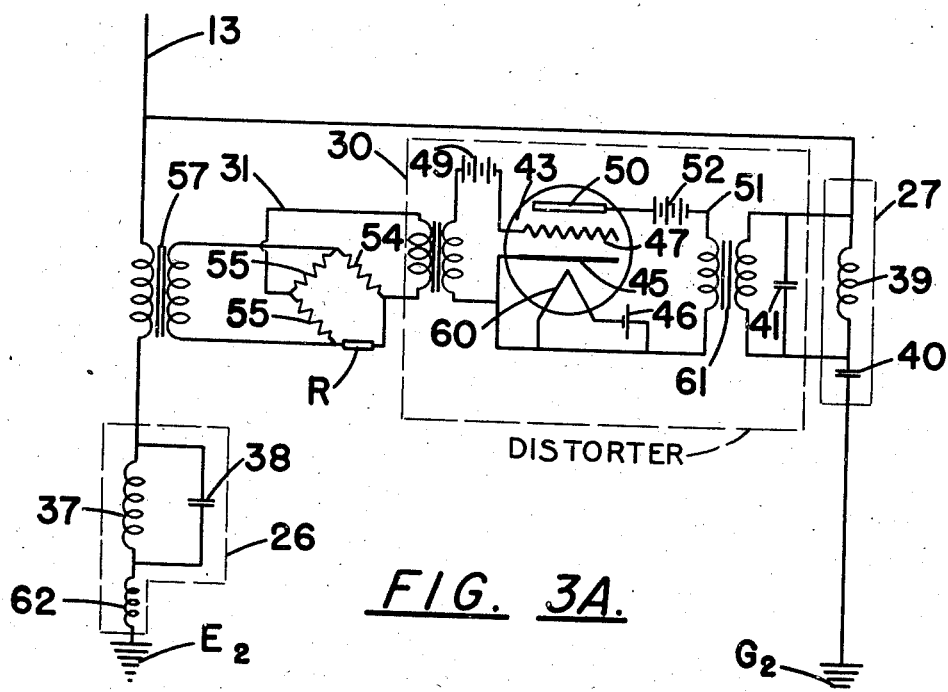
Fig. 3A is a wiring diagram showing in detail a portion of the apparatus appearing in Figs. 1A and 2A.

In the modification shown in Figs. 1A, 2A and 3A diagrams are shown of a movable portion which may be used in conjunction with the surface equipment shown in Figs. 1, 2 and 3. This movable portion will be connected to the surface equipment through a single conductor cable. The modification of Figs. 1A, 2A and 3A enables measurements of natural potential, single electrode impedance, and temperature to be obtained in the bore hole.

Referring specifically to the drawings and first to the modification shown in Figs. 1, 2 and 3, a bore hole 10 penetrates into the earth and contains a fluid, such as drilling mud or water, having an upper level indicated as 11. Arranged within the bore hole is an electrode carrying case 12 suspended by a single conductor cable 13 having its upper end attached to hoist 14. The hoist is provided with slip rings 15 which make an electrical connection with conductor 16 which, in turn, leads to the surface measuring and recording device 17.

At the surface of the earth are arranged electrodes $E_1$ and $G_1$ which are electrically connected to receiving and recording apparatus 17 by electrical conductors 18 and 19, respectively. On the surface of electrode carrying case 12 are exposed electrodes or grounding means $E_2$, $G_2$, $P_1$ and $P_2$.

Arranged at the surface of the earth is a source of alternating current 20, with low internal D. C. resistance, which is connected to ground or electrode $E_1$ through ammeter 9 and band-pass filter 21 by means of conductor 18. The source of alternating current 20 is connected to conductor 16 which makes connection through slip ring 15 to single conductor cable 13 attached to the portion of the device to be vertically moved in the bore hole. Conductor 16 is connected to ground electrode $G_1$ through high-pass filter 22 by means of branch conductor 19.

The voltage drop across alternating current source 20 is indicated by voltmeter 8 connected across this source of alternating current. The voltage drop across the band-pass filter 21 is obtained by voltmeter 23, and a voltage drop in the portion of the circuit including high-pass filter 22 is obtained by voltmeter 24 which is connected to transformer 25 which, in turn, has its other side connected to conductor 19.

In considering the portion of the device which is arranged within electrode carrier 12 to be lowered into the bore hole it will be seen that at the lower end of single conductor cable 13 the circuit branches, one branch leading through low-pass filter 26 to ground electrode $E_2$, while the other branch leads to high-pass filter 27. It will be seen that high-pass filter 27 is provided with four connections, on one side one of the connections leads to the single conductor of cable 13 and the other leads to electrode $G_2$, while on the other side the two connections lead through conductors 28, 29 to a distorter 30 which, in turn, is connected to the two electrodes or grounds $P_1$ and $P_2$ by conductors 31 and 32.

The filters shown in these diagrams are conventional to the art. A mode of constructing these filters is shown in detail in Fig. 3 in which band-pass filter 21 is shown as constructed by having condenser 33 and inductance coil 34 connected together, high-pass filter 22 composed of inductance coil 35 and condenser 36 connected in series, low-pass filter 26 composed of inductance coil 37 connected in parallel with condenser 38 and these impedance elements connected to inductance 62, and high-pass filter 27 as being constructed of inductance 39 and condenser 40 connected together.

In distorter 30 is arranged a transformer 61, one side of which is connected to electrical conductors 28 and 29 which, in turn, have a condenser 41 connected across them. A second transformer 42 has one side connected to electrodes $P_1$ and $P_2$ by conductors 31 and 32, respectively. The other leads of transformers 61 and 42 are connected together by a circuit including a vacuum tube 43.

As seen in Fig. 3, one lead of each of transformers 61 and 42 is connected together by conductor 44. Cathode 45 of the vacuum tube connects to conductor 44. Heater 60 of the vacuum tube is also electrically connected to conductor 44, the connection including heater battery 46. The other lead of transformer 42 is electrically connected to grid 47 of the vacuum tube by conductor 48 which has in series therewith battery 49. The other lead to transformer 61 is electrically connected to plate 50 of the vacuum tube by conductor 51 which has arranged therein plate battery 52.

Figure 4:
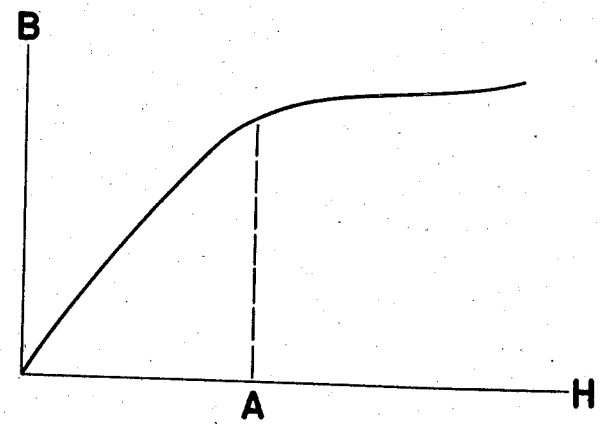
Fig. 4 is the saturation curve for transformers suitable for use in practicing the invention and showing the desired operating point for such transformers.

The diagram appearing in Fig. 4 shows the saturation curve of the transformer 61. The preferred operating point for the transformer is indicated by the point A. In order to operate at this point the output of battery 49 is adjusted so that the current from plate 50 is of sufficient magnitude to allow the transformer to operate in the preferred range.

In operating the device, the electrode carrier 12 is lowered into the bore hole, while alternating current is produced by the source of alternating current 20. The energizing current will pass from $E_1$ at the surface of the earth to $E_2$ arranged within the bore hole. Since the energizing current is alternating, it will not affect the direct potential between these two electrodes and, as a consequence, the direct current potential is indicated by voltmeter 23.

If the current from 20 is constant its flow through the circuit comprised by the cable 13, electrodes $E_1$ and $E_2$ and the ground will be constant, and the voltage indicated by voltmeter 8 will be proportional to the single electrode impedance. In addition, the current flowing from electrode $E_1$ to $E_2$ will produce a potential of frequency $F_1$, the same frequency as produced by alternating current source 20 across electrodes $P_1$ and $P_2$, which is proportional to the mutual impedance of the four electrodes $E_1$, $E_2$, $P_1$ and $P_2$. The potential across electrodes $P_1$ and $P_2$ will be distorted by device 30 to a higher frequency than $F_1$ and will be applied through filters 27 and 22 and electrodes $G_1$ and $G_2$ to voltmeter 24. This voltage will vary in a known manner with the voltage across electrodes $P_1$ and $P_2$ and will therefore be a measure of the four electrode mutual impedance. If the alternating current produced by 20 is of constant amplitude, the measurements may be read off from the various instruments, as above described, and ammeter 9 is not a necessary part of the circuit. If, however, the alternating current produced by 20 is of a variable amplitude, the readings by ammeter 9 must be obtained and used to apply suitable corrections to the results indicated by meters 8 and 24. Making corrections for variations in the amplitude of an energizing current is well known to the art and will therefore not be described here.

As a specific example in making measurements with the apparatus shown by Figs. 1, 2 and 3, energizing device 20 was selected to produce a constant frequency current of 60 cycles per second. Voltmeter 8 and ammeter 9 were sensitive to 60 cycle current. Voltmeter 23 was a D. C. voltmeter not sensitive to alternating current. Filter 21 was selected to pass 60 cycle and higher current, while filter 22 was a high-pass filter tuned to 180 cycles per second. Voltmeter 24 was an alternating current voltmeter tuned to 180 cycle per second current. Filter 26 was a low-pass filter with inductance and capacity selected to cut out a 180 cycle current, while filter 27 was tuned to act as a high-pass filter and to reject 60 cycle current.

In this example the alternating current did not affect voltmeter 23 which measured the natural potential between electrode $E_1$ and $E_2$. The alternating current flowing through the cable to $E_2$ and then through the earth to $E_1$ was indicated by voltmeter 8. Only current distorted to 180 cycles was able to flow through filter 22 and be indicated by voltmeter 24. It will thus be seen that measurements of three different quantities were obtained in the bore hole and that only a single conductor cable was necessary for transmitting all of these signals.

In the modification illustrated in Figs. 1A, 2A and 3A the three measurements obtained are potential, single electrode impedance and temperature. In this modification the surface equipment shown in Figs. 1, 2 and 3 is used, but the equipment lowered into the bore hole differs somewhat from that shown in the above described modification. In the modification shown in Figs. 1A, 2A and 3A the electrode case 12 has arranged thereon electrodes $E_2$ and $G_2$, but instead of having in addition the electrodes $P_1$ and $P_2$ it is provided with a high temperature coefficient resistance R.

As may be seen from the drawings, the modification shown in Figs. 1A, 2A and 3A contains low-pass filter 26, high-pass filter 27, distorter 30, and electrodes $E_2$ and $G_2$, as in the preceding modification. However, conductors 31 and 32 connected to distorter 30 lead, instead of to electrodes $P_1$ and $P_2$, to an alternating current bridge 53 which is composed of resistances 54, 55, 56 and R. Resistances 54, 55 and 56 are low temperature coefficient resistances, while resistance R is a high temperature coefficient resistance. One side of a transformer 57 is connected to conductor 13 and low-pass filter 26, while the other side of the transformer is connected to the electrical bridge 53.

It will be apparent that in the device above described the natural potential and single electrode impedance in the bore hole will be obtained in exactly the same way as in the apparatus shown in Figs. 1, 2 and 3. It will also be apparent that the resistance R exposed to the fluid in the bore hole will experience temperature changes dependent upon the temperatures of the fluid in the bore hole with which it comes in contact. These temperature changes will cause the balance of electrical bridge 53 to change.

If the bridge is balanced when casing 12 is lowered into the bore hole, it will become unbalanced due to the temperature change of the fluid in the hole, or if the bridge is unbalanced at the surface of the earth, the amount of unbalance will change in proportion to the temperature change in the resistance R. The current to operate the bridge is obtained from cable 13 by means of transformer 57, and the change in temperature of resistance R causes the amount of current passing to distorter 30 to be varied as a function of the temperature of R. In turn, the signal produced by distorter 30 is passed through high-pass filter 27 and then from $G_2$ through the ground to electrode $G_1$ where the signal is indicated by voltmeter 24.

While I have disclosed two modifications of the present invention whereby three separate measurements may be obtained by the use of only a single conductor cable, it will be evident to a skilled worker in the art that other measurements may be made. In the modifications above described, in addition to the natural potential and single electrode impedance, I have disclosed that either four electrode mutual impedance or else temperature measurements may be obtained. It will be apparent to a skilled worker in the art that, instead of obtaining the four electrode mutual impedance or the temperature, signals indicating the pressure or the readings of an inclinometer may be transmitted to the surface of the earth. It is therefore not my intention to be limited to the specific modifications disclosed, but to claim my invention as broadly as the prior art permits.

I claim:

1. A method of investigating earth formations traversed by a borehole comprising the steps of generating an alternating current of a given frequency at the surface of the earth, passing the alternating current of given frequency through the formations surrounding the borehole while maintaining the value thereof substantially constant, picking up in the borehole an alternating potential value of the same frequency as said given frequency and converting it to a different frequency, picking up in the borehole a direct current value related to spontaneous potentials existing in the borehole, combining said direct current value with the alternating current of given frequency and the alternating current of different frequency, transmitting said combined currents to the surface of the earth and obtaining separate indications of the potentials of the direct current, the generated alternating current and the picked up alternating current.

2. Apparatus for investigating simultaneously a plurality of different electrical characteristics of earth formations traversed by a borehole, comprising, means at the surface for generating an alternating current of a given frequency and a substantially constant value, an electrode for passing said alternating current through the earth formations surrounding the borehole, a first filter adapted to pass direct current and alternating current of said given frequency and to block alternating current of other frequencies, electrically connected to the electrode, a single electrical circuit connecting said generating means with said filter, a pickup circuit disposed in the borehole for picking up in the borehole alternating current potentials produced by the flow of the generated alternating current through the formations, frequency converting means in the pickup circuit for converting the alternating current potentials picked up into alternating current of a frequency different from said generated current, a second filter in said pickup circuit for blocking the generated current and for passing only the frequency of the output of the converting means, electrical connections between the second filter and the single electrical circuit for introducing therein the alternating current passed by the second filter, indicating means connected to said single electrical circuit at the surface for obtaining an indication of said last-named alternating current values, an indication of the potential of the generated alternating current and an indication of direct current potentials.

WILLIAM M. RUST, Jr.